July 23, 1968     J. E. LANIER     3,393,898
FERTILIZER BLENDER
Filed March 29, 1967     2 Sheets-Sheet 1
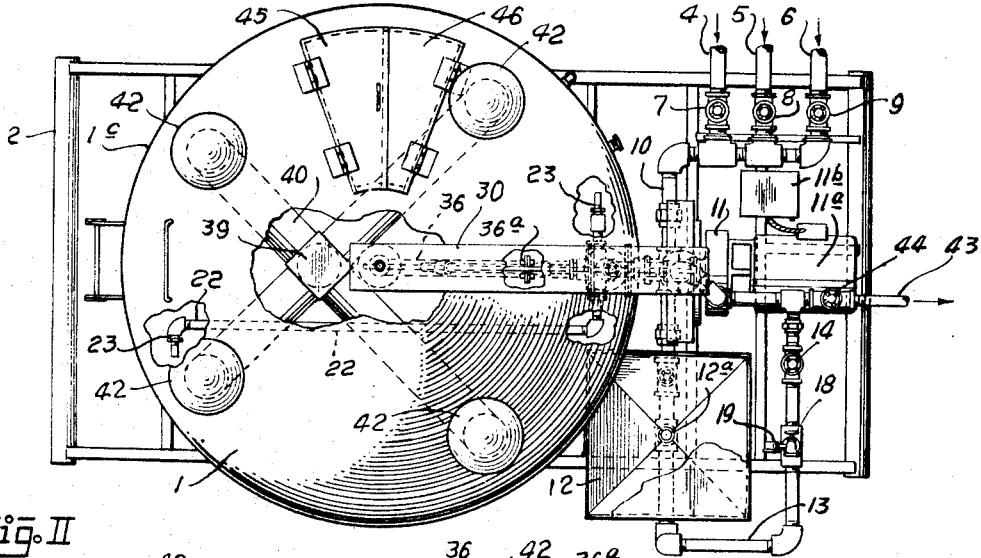
Fig. II
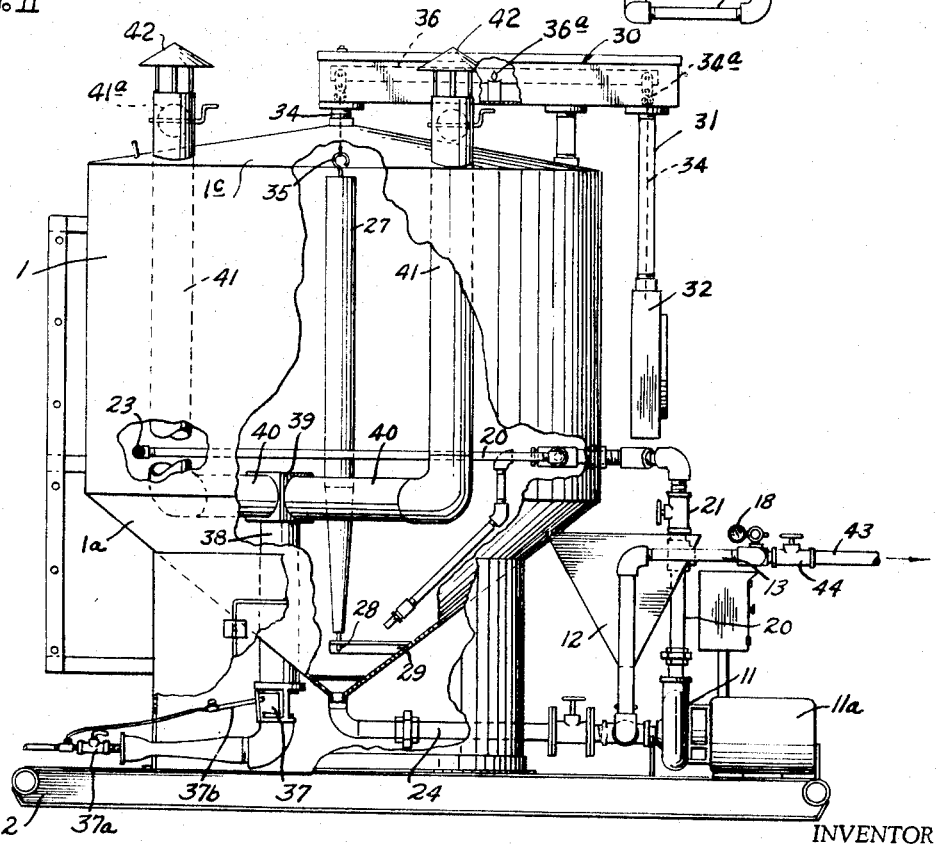
Fig. I
INVENTOR
Juan E. Lanier
BY Howard E. Moore
ATTORNEY July 23, 1968  J. E. LANIER  3,393,898
FERTILIZER BLENDER
Filed March 29, 1967  2 Sheets-Sheet 2
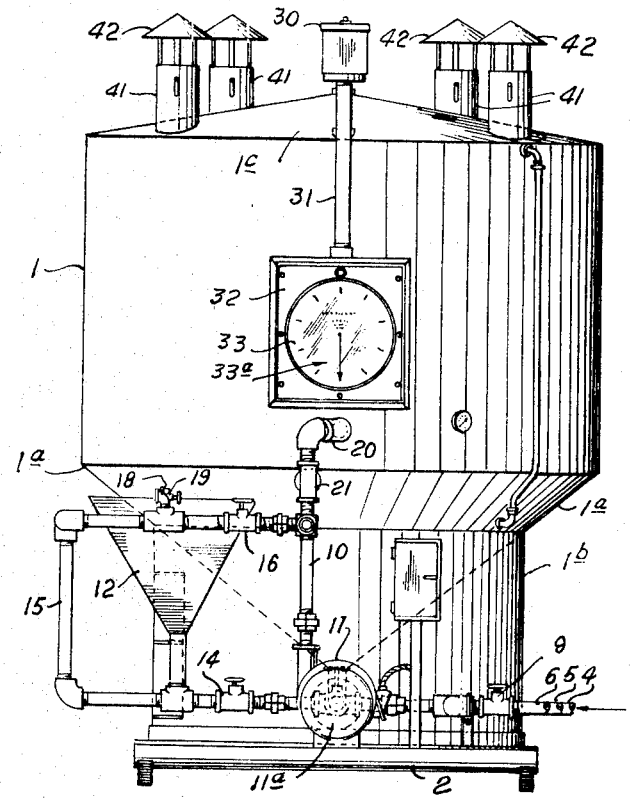
Fig. III
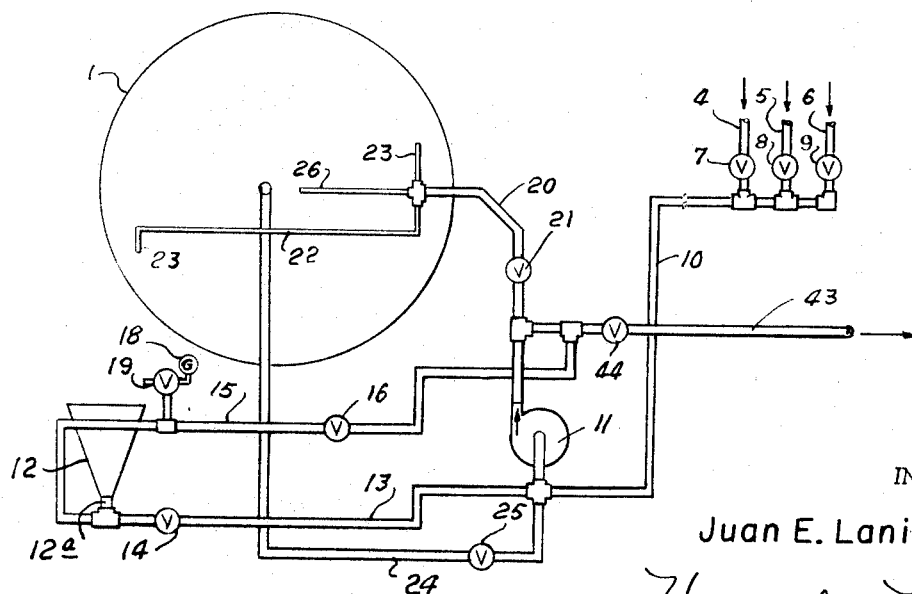
Fig. IV
INVENTOR
Juan E. Lanier
BY Howard E. Moore
ATTORNEY

United States Patent Office 3,393,898
Patented July 23, 1968

3,393,898
FERTILIZER BLENDER
Juan E. Lanier, Dallas, Tex., assignor to Agricultural Chemical Equipment Company, a division of Ferguson Industries, Dallas, Tex., a corporation of Texas
Filed Mar. 29, 1967, Ser. No. 626,857
8 Claims. (Cl. 259—4)

ABSTRACT OF THE DISCLOSURE

A fertilizer blender wherein the various ingredients for commercial fertilizer are injected into a mixing chamber through injection orifices directed laterally of the container to create turbulence. Heat exchange conduits pass upwardly through the container to impart heat to the mixture and material is continuously weighed by a displacement meter. The material may be recirculated for thorough blending.

---

A device for mixing various ingredients of commercial fertilizer and for simultaneously weighing same while it is being mixed.

The device includes a container which may be supplied with various ingredients for commercial fertilizer through multi-valved conduits so that they may be injected either simultaneously or separately. The material is injected into the container through injection orifices which are turned in opposite directions for agitation purposes. The mixture may be heated as it is mixed and for such purpose has heat exchange conduits extending upwardly through the container which are in communication with a gas burner so that the heat of combustion passes upwardly through the pipes to heat the mixture. The gases of combustion are vented at the upper ends of the pipes through the top of the container. The material injected may be continuously weighed as it is mixed by a displacement meter consisting of a buoyant cylinder suspended in the container on a balance arm which actuates a scale or other indicating element outside the container which is calibrated in pounds.

Means is provided for circulation and blending of the material after injection of ingredients ceases.

It is, therefore, a primary object of the invention to provide a combination mixing, blending, and weighing device for commercial fertilizer wherein the mixture is continuously heated as it is mixed.

Another object of the invention is to provide a device for simultaneously mixing and weighing commercial fertilizer wherein the mixture may be recirculated within the container for sufficient length of time to provide thorough blending and mixing.

Still another object of the invention is to provide a fertilizer mixing and heating device wherein the materials making up the mixture may be individually or collectively injected and are injected through nozzles turned in opposite directions in order to provide circular, agitated, motion of the material within the container to provide thorough mixing, and which includes heater conduits extending vertically in the container so that the material circulated within the container will contact heat exchange surfaces of the conduits to provide uniform heating of the material as it is mixed.

Still another object of the invention is to provide a device for mixing various ingredients of fertilizers within a container wherein the material is circulated and agitated as it is injected to provide uniform mixing and blending and to bring same into contact with heater conduits extending upwardly therethrough in spaced relationship within the container, and which includes a vertically disposed displacement indicator cylinder suspended in the uniformly mixed material to actuate a displacement meter viewable from outside the container to indicate the weight of material within the container at any given time while it is being mixed. Thereby the individual materials, both dry and liquid, may be accurately weighed as they are injected and integrated with the other materials.

Other and further objects of the invention will become apparent upon reading the detailed specification hereinafter following and by referring to the drawings annexed hereto.

A suitable embodiment of the invention is shown in the attached drawings wherein, FIGURE I is a side elevational view, partially cut away, to show the buoyant scale actuation cylinder, and the heat exchange conduits extending upwardly through the container, FIGURE II is a top plan view partially cut away to show the heat exchange conduits, FIGURE III is a side elevational view taken from the right side of FIGURE I, and FIGURE IV is a diagrammatic view of the fertilizer material injection and recirculating system.

Numeral references are employed to indicate the various parts shown in the drawings and like numerals indicate like parts throughout the various figures of the drawings.

The numeral 1 indicates a generally cylindrical container having a conical shaped bottom 1a which is surrounded by a cylindrical base 1b which in turn may be mounted on skids 2 for transporting same.

Inlet pipes 4, 5, and 6, through which liquid fertilizer material may be admitted to the container 1 for mixing therein in the manner hereinafter described, have manual control valves 7, 8, and 9 mounted therein so that all ingredients may be injected simultaneously, or individually selected ingredients may be admitted to the system by closing selected ones of the valves.

The conduits 4, 5, and 6 communicate through valves 7, 8, and 9 with a common inlet conduit 10.

The material is drawn into the system and circulated therein by a pump 11 which communicates with the conduit 10. The pump 11 is driven by an electric motor 11a through a control box 11b.

Granular or powdered fertilizer ingredients such as potash may be injected into the system from the conical hopper 12 which communicates with a conduit 13 through a venturi connection valve 14. The granular or powdered material in the hopper 12 may be drawn into the system by the pump 11 either upon the original injection of materials through conduits 4, 5, and 6, or upon the recirculating cycle, hereinafter described. Valve 14 permits optional injection of material from hopper 12 during the mixing cycle.

A pressure gauge 18 communicates with a conduit 15 through a valve 19, which in turn communicates with the conduit 13. A valve 16 is positioned in the conduit 15 through which the pressure gauge 18 may be placed in communication with the injection circuit through open valve 19 to visually observe the pressure in the system to guard against excessive pressure.

The material injection pipe 10 communicates through pump 11 with the injection pipe 20 when valve 21 is open.

The injection pipe 20 communicates with a horizontally disposed dispersal pipe 22 in the container 1. The dispersal pipe 22 has dispersal nozzles 23 and 26 on the ends thereof. Nozzles 23 are turned in opposite directions so that material injected under pressure from the nozzles will take a circular path about the interior of the cylindrical container 1 in opposite directions so that there is a thorough mixing and agitation of the ingredients within the container as it is injected thereinto. Injection nozzle 26 provides for agitation and mixing of the material centrally of the container 1.

A recirculating conduit 24 communicates with the apex of the conical bottom 1a of the container 1 and flow therethrough is controlled by a valve 25, the operation and function of which will be described hereinafter.

An elongated hollow buoyant cylinder 27 is suspended substantially centrally of the container 1. The opposite ends of the cylinder 27 are closed and the lower end thereof has a guide pin 28 thereon which slidably extends through a hole provided in a horizontal bracket 29, secured to the inner wall of the conical portion 1a of the container 1.

A meter supporting bracket 30 is mounted on hollow support legs 30a and 30b secured to the top of the container 1. A depending tube 31 is secured to the lower wall of the bracket 30 and communicates with the interior thereof.

A meter housing 32 is suspended to the depending tube 31 and the interior of the housing 32 communicates with the tube 31.

A meter 33 is mounted in the housing 32 and has a face thereon viewable through a transparent cover 33a so that the indicia on the face of the meter can be observed. The meter is preferably calibrated in pounds.

A cable or other flexible suspending member 34 is pivotally attached to the outer end of the balance arm 36 by means of a pivoted link 34a. The cable 34 may move upwardly and downwardly in the tube 31 to actuate the meter 33 in response to the upward and downward movement of the buoyant cylinder 27.

A hook 35 is provided on the upper end of the cylinder 27 which has secured thereto a cable or other flexible suspending member 35a, which extends through the hollow support leg 30a and is pivotally attached to the end of the balance arm 36 by pivoted link 36b.

The balance arm 36 is balanced at the mid-point thereof on a pivot 36a so that the ends of the balance arm may move up and down about the pivot in response to the movement of the cylinder 27 by buoyant action as the container 1 is filled.

A gas burner 37 is mounted in the base enclosure 1b and the flow of gas thereto is controlled by manual valve 37a, and may be lit by a pilot 37b.

A vertically disposed conduit 38 is positioned above the burner 37 and communicates with the manifold 39. Horizontally disposed pipes 40 radiate from the manifold 39, and vertically disposed heat exchange flue pipes 41 communicate with the horizontal pipes 40. The flue pipes 41 extend upwardly through the container 1 and outwardly through the cover 1c of the container to provide upward portions extending above the cover 1c in which manually operated control dampers 41a are mounted. Heat deflecting baffles 42 are provided in spaced relationship above the upper ends of the flue pipes 41.

It will be seen that the heat of combustion supplied by the burner 37 will pass upwardly through the pipe 38, manifold 39, horizontal pipes 40 and vertical flue pipes 41 to be discharged through said flue pipes above the container.

Heat radiates through the wall of the flue pipes and supply pipes therefor as it passes therethrough and thereby provides heat exchange media for heating the fertilizer material within the container as it is agitated and mixed.

It will be noted that the multiplicity of flue pipes 41 are spaced about the interior of the container so that the fertilizer material repeatedly comes in contact with the surfaces thereof as it is discharged into and agitated in the container by discharge nozzles 23 and 26, thereby providing uniform heating thereof.

The discharge conduit 43 through which the container 1 may be evacuated after the fertilizer material is mixed therein has flow therethrough controlled by a valve 44.

The manipulation of valves to evacuate the container will be described hereinafter.

Access doors 45 and 46 are hinged to the edges of an opening through the cover 1c of the container 1 to provide access to the interior of the container for inspection, cleaning, or through which fertilizer material may be added if desired.

The operation and function of the device hereinbefore described is as follows:

Liquid fertilizer ingredients are injected into the container through conduits 4, 5, and 6, supply pipe 10 and injection pipe 20, being drawn therethrough by the pump 11. Individual ingredients or a multiplicity of ingredients may be injected through the supply pipes 4, 5, and 6 by manipulation of the valves 7, 8, and 9. Valve 21 would be open during injection. If it is desired that only material be injected through the supply pipes 4, 5, and 6, the valves 14 and 16 would be closed closing off hopper 12. However, if it is desired that material be drawn from the hopper 12 for mixing with the other ingredients the valve 14 would be open during the injection cycle. The discharge valve 44 and recirculation valve 25 would be closed during the injection cycle. If it is desired to observe the pressure in the system during the injection cycle valves 16 and 19 would be opened leading to the gauge 18 which would render the gauge 18 operable even though the valve 14 is closed to prevent injection of material from the hopper 12.

Material injected through the container supply pipe 20 is forced through the orifices 23 and 26 to causes the injected material to be discharged in opposite circular motion and transversely of the container to thoroughly mix the material and agitate same as it is injected to thereby cause a thorough mixing and blending of the material. At the same time the blended material is circulated about and within the container, causing it to come into contact with the heat exchange pipes 42 to uniformly heat the same, while it is being blended, which is necessary to the homogenous mixing and blending of the ingredients of the fertilizer.

As the level of the mixture rises in the container 1 it is further agitated by the injection of the fertilizer material thereinto through the nozzles 23 and 26.

Furthermore, as the mixture rises in the container the buoyant cylinder 27 is caused to be displaced by the liquid and progressively rises therewith causing the actuation of the meter 33 through the pivoted balance arm 36 and cables 35a and 34 to thereby indicate the pounds of material in the container 1 at any given time.

After the sufficient amount of material has been mixed and blended in the container by injection it may be desirable that further agitation be carried out in order to thoroughly blend the material. For such purpose the mixed material may be recirculated through the container. In order to carry out this function the valves 7, 8, and 9, 14 and 16 are closed to discontinue the injection of ingredients into the container. Discharge valve 44 remains closed. Valves 25 and 21 only are open to allow material to be drawn from the tank 1 through the recirculating pipe 24 by the pump 11 and injected into the container through the nozzles 23 and 26. Such recirculation may be continuously carried out as long as may be desired. Valves 16 and 19 may be opened to allow gauge 18 to indicate pressure in the circuit during recirculation.

In order to evacuate the mixed material from the container 1 the valves 25 and 44 are opened and all other valves in the system are closed. This allows the pump 11 to withdraw the mixture from the container 1 through the circulating pipe 24 and discharge pipe 43 from which it may be deposited in a suitable container such as a tank on a transport vehicle.

It will thus be seen that I have provided a fertilizer mixing apparatus wherein the ingredients to be mixed may be selectively injected into the mixing container in such manner as to thoroughly agitate, mix and blend the materials as they are injected; wherein the materials are uniformly heated as they are blended and mixed; which are continuously weighed as the materials are blended and mixed; in which the blended material may be recirculated and agitated for more thorough mixing and blending, and in which the material may be withdrawn from the container by the same pump with which the material is injected.

It will be understood that other and further embodiments of my invention may be devised without departing from the spirit and scope of the appended claims.

Having described my invention I claim:

1. In a device for mixing and blending fertilizer materials, a container, a plurality of valved conduits communicating with the container for injecting selected numbers of materials into the container; an injection conduit providing communication between the valved conduits and the container; a pump communicating with the injection conduit arranged to draw the fertilizer material through the valved conduits and force same through the injection conduit; a plurality of nozzles arranged in the container and turned in different directions to provide agitation of the materials in the container as it is injected through said nozzles; and heat exchange members extending vertically through the container in spaced relationship therein arranged to contact the fertilizer material as it is agitated in the container; and means to supply heat to the heat exchange members.

2. The combination called for in claim 1 with the addition of a valved recirculating conduit communicating with the pump and with the injection conduit to permit the recirculation of the material through the nozzles and the container.

3. The combination called for in claim 2 with the addition of a valved discharge conduit communicating with the pump and the recirculating conduit to permit the discharge of material from the container with the valved inlet conduits and the valved injection conduit closed.

4. The combination called for in claim 1 with the addition of an auxiliary conduit communicating with the inlet side of the pump and the outlet side of the pump and with the injection conduit, said auxiliary conduit having an injection hopper communicating therewith through which dry fertilizer material may be injected; and valve means in the auxiliary conduit arranged to close circulation therethrough.

5. The combination called for in claim 4 with the addition of a pressure gauge communicating with the auxiliary conduit between the said valve means therein and the intake side of the pump; and valve means in the auxiliary conduit between the pressure gauge and the outlet side of the pump.

6. The combination called for in claim 1 with the addition of a buoyant displacement body vertically disposed in the container; a pivoted balance arm above the container, the displacement body being suspended to one end of the balance arm; a meter actuation member suspended to the other end of the balance arm; and a meter arranged to be actuated by the meter actuation member mounted outside the container to indicate the weight of the contents of the container at all times.

7. The combination called for in claim 1 wherein the heat exchange members are conduits, extending through the top of the container; and means to admit heat to the lower ends of the conduits.

8. The combination called for in claim 7 wherein the means to admit heat to the lower ends of the heat exchange conduits is a gas burner located below the container communicating with the heat exchange conduits.

References Cited

UNITED STATES PATENTS

| | | | |
|---|---|---|---|
| 2,900,176 | 8/1959 | Krogel | 259—95 |
| 2,978,300 | 4/1961 | McCowen | 259—95 |
| 3,233,874 | 2/1966 | Betulius | 259—95 |
| 3,334,868 | 8/1967 | Lage | 259—95 X |

ROBERT W. JENKINS, *Primary Examiner.*